United States Patent
Rachic

[15] 3,647,240
[45] Mar. 7, 1972

[54] KICK BLOCK

[72] Inventor: Joseph Rachic, P. O. Box 109, Bessemer, Pa. 16112

[22] Filed: Apr. 2, 1970

[21] Appl. No.: 25,006

[52] U.S. Cl.................................280/150, 280/164, 296/1
[51] Int. Cl...........................................B62d 23/00
[58] Field of Search................280/164, 164 A, 150; 296/1, 296/75

[56] References Cited

UNITED STATES PATENTS

| 1,353,553 | 9/1920 | Sweet | 280/150 X |
| 2,559,123 | 7/1951 | Jackson | 280/164 A |
| 3,237,964 | 3/1966 | Doyle | 280/150 X |

*Primary Examiner*—Benjamin Hersh
*Assistant Examiner*—Winston H. Douglas

[57] ABSTRACT

A shoe-kicking device for an automotive vehicle, the device comprising a wooden block mounted to a bracket, the bracket being mountable within a pair of clamps affixed to the chassis frame of an automotive vehicle so that the block in use, is in a position where a person may kick his feet upon entering the vehicle so to remove snow or slush from his shoes.

3 Claims, 3 Drawing Figures

PATENTED MAR 7 1972 3,647,240

INVENTOR
JOSEPH RACHIC

KICK BLOCK

This invention relates generally to shoe kicking devices for automotive vehicles.

A principle object of the present invention is to provide a kick block which can be readily secured to existing automotive vehicles, and which can be incorporated into the construction of new vehicles presently being manufactured.

Still another object of the present invention is to provide a kick block which when not in use is located beneath the automobile body so that it does not detract from appearance thereof.

Other objects of the present invention are to provide a kick block which is simple in design, inexpensive to manufacture, rugged in construction, easy to use and efficient in operation.

These and other objects will be readily evident upon a study of the following specification and the accompanying drawing wherein.

Figure 1:
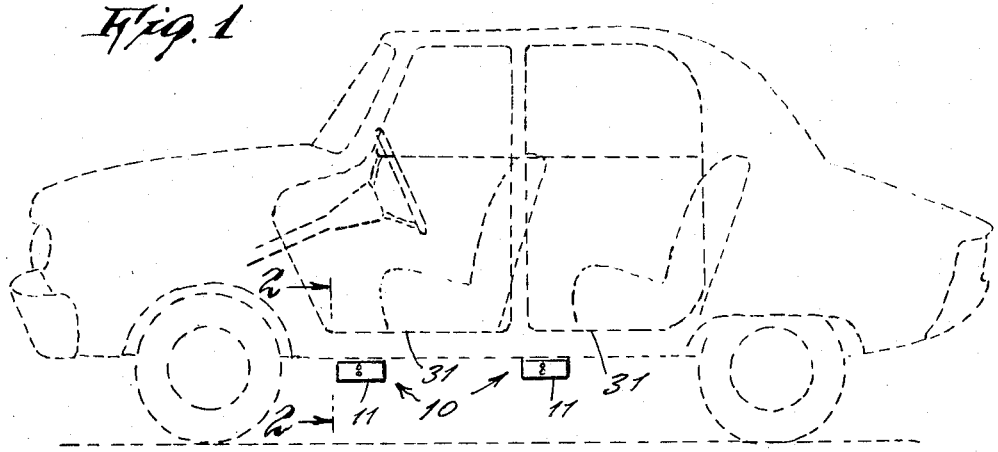
FIG. 1 is a side elevation view of an automotive vehicle showing the present invention incorporated therein.

Referring now to the drawing in detail, the reference numeral 10 represents a kick block according to the present invention wherein there is a wooden block 11 of approximately 2 by 4 by 6 inches dimension. The wooden block 11 is secured by means of a pair of carriage bolts 12 to one end of an L-configurated bracket 13, the bracket 13 including a tongue 14 which is slidably receivable within a pair of clamps 15 and 16.

Figure 2:
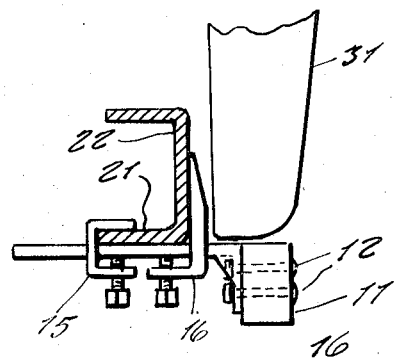
FIG. 2 is an enlarged side elevation view of the present invention as viewed along line 2—2 of FIG. 1.
Figure 3:
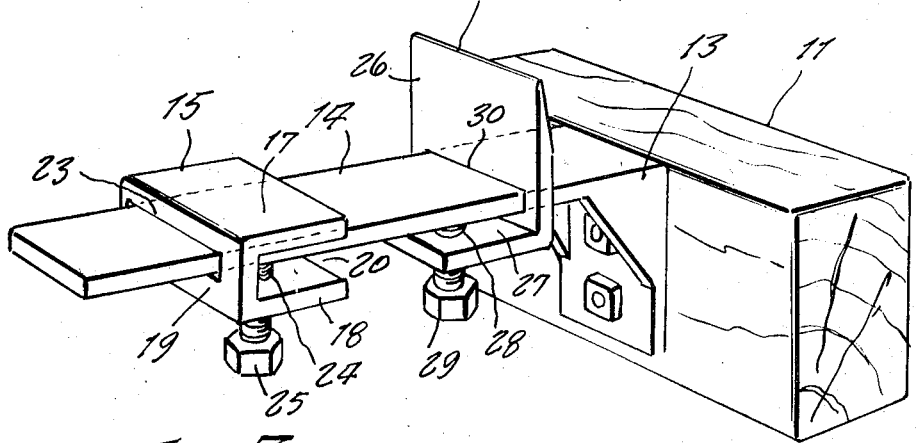
FIG. 3 is a perspective view of one of the kick block assemblies.

The bracket 15 is of generally channel configuration having parallel spaced-apart opposite sidewalls 17 and 18 interconnected by means of an intermediate wall 19. A throat 20 is formed between the parallel opposite walls 17 and 18 and into which one side 21 of a channel 22 of the vehicle chassis is receivable, as shown in FIG. 2 of the drawing. The intermediate wall 19 is provided with a slot 23 there through and through which the tongue 14 is slidable.

A lower wall 18 of the clamp 15 is provided with a threaded opening 24 within which there is threadingly engaged a bolt 25 as shown.

The clamp 16 comprises a generally angle configurated member having a vertical wall 26 that is at right angle to a horizontal wall 27. The wall 27 is provided with a threaded opening 28 therethrough receiving a bolt 29.

In installing the kick block, the clamps 15 and 16 are secured to the channel 22 of the automobile chassis, the tongue 14 of the bracket 13 then being inserted through the slot 30 of the clamp 16 and the slot 23 of the clamp 15.

A kick block 10 is positioned below each doorway 31 of the vehicle where it may be conveniently used by persons entering the automobile.

The kick block is stationary. It will always be out of the way but it can be reached when needed. A person using the device merely kicks the snow or slush off his shoes.

The block can be removed for the summer months and replaced for the winter months.

Thus there is provided a convenient kicking device for a person entering a vehicle and thus preventing slush, mud or snow from being tracked into the car.

What I now claim is:

1. In a kick block, the combination of a wooden block, said block being adaptable for a person kicking his shoes thereagainst for removing snow, slush or mud therefrom, said block being mounted to a bracket, and means for supporting said bracket, said means for supporting said bracket comprising a pair of clamps, one of said clamps comprising a generally U-shaped member and the other of which comprises an angle-shaped member, said clamps being securable to a channel of the chassis of an automotive vehicle, one of said clamps comprising said U-shaped member including a pair of spaced-apart horizontal walls and an intermediate vertical wall along one edge of said horizontal walls, said intermediate wall having a slot therethrough for passage of a bracket portion, a throat being formed between said horizontal walls into which a flange of said channel of said vehicle chassis may be inserted, and a lower wall of said clamp having a threaded opening receiving a bolt for bearing against said bracket portion.

2. The combination as set forth in claim 1, wherein, the other said clamp comprising said angle-configurated member includes a vertical wall positioned for securement alongside said channel of said automobile chassis, and a horizontal wall having a threaded opening receiving a bolt for bearing against said bracket portion, and said vertical wall having a slot for the passage of said bracket portion.

3. The combination as set forth in claim 2, wherein said bracket includes a horizontally extending tongue, said tongue being slidable within said slots of said brackets, said bolts of said clamps being in alignment to bear against an underside of said tongue of said brackets.

* * * * *